United States Patent
Naito et al.

(10) Patent No.: US 11,506,271 B2
(45) Date of Patent: Nov. 22, 2022

(54) TORQUE DAMPER APPARATUS AND TORQUE CONVERTER

(71) Applicant: Kabushiki Kaisha F.C.C., Hamamatsu (JP)

(72) Inventors: Tetsuya Naito, Shizuoka (JP); Yuki Okamoto, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 17/326,546

(22) Filed: May 21, 2021

(65) Prior Publication Data

US 2021/0381586 A1  Dec. 9, 2021

(30) Foreign Application Priority Data

Jun. 4, 2020 (JP) .............................. JP2020-097646

(51) Int. Cl.
  *F16H 45/02* (2006.01)
(52) U.S. Cl.
  CPC ..... *F16H 45/02* (2013.01); *F16H 2045/0226* (2013.01); *F16H 2045/0284* (2013.01)
(58) Field of Classification Search
  CPC .. F16F 15/121; F16F 15/1213; F16F 15/1216; F16F 15/123–12346; F16F 15/20–223; F16F 15/28; F16F 15/286; F16F 15/32; F16H 2045/0221–0231
  See application file for complete search history.

(56) References Cited

U.S. PATENT DOCUMENTS

| | | | | | |
|---|---|---|---|---|---|
| 4,778,040 | A | * | 10/1988 | Kabayama | F16D 13/58 192/DIG. 1 |
| 5,447,218 | A | * | 9/1995 | Tauvron | F16H 45/02 192/3.29 |
| 5,762,558 | A | * | 6/1998 | Takehira | F16F 15/32 464/68.1 |
| 5,899,311 | A | * | 5/1999 | Yamamoto | F16F 15/1232 192/55.61 |
| 5,947,253 | A | * | 9/1999 | Yabe | F16H 45/02 192/3.29 |
| 10,821,819 | B2 | * | 11/2020 | Heuver | B60K 6/40 |
| 2021/0190187 | A1 | * | 6/2021 | Hoff | F16F 15/12353 |

FOREIGN PATENT DOCUMENTS

JP    2019-178720 A    10/2019

* cited by examiner

*Primary Examiner* — David R Morris
*Assistant Examiner* — James J Taylor, II
(74) *Attorney, Agent, or Firm* — Rankin, Hill & Clark LLP

(57) ABSTRACT

A torque damper apparatus includes an input-side plate having a pair of side plates and rotatably driven in response to drive force from a motor, a center plate coupled to an output shaft and arranged between the pair of side plates, and an elastic transmission body provided between the input-side plate and the center plate to transmit rotary drive force of the input-side plate to the center plate. The input-side plate has, at a plate surface of at least one side plate, multiple weight attachment holes for attaching a balance weight. Each weight attachment hole is formed in a long hole shape extending along a circumferential direction at an outer edge portion of the side plate.

13 Claims, 7 Drawing Sheets

TORQUE DAMPER APPARATUS AND TORQUE CONVERTER

CROSS-REFERENCE TO RELATED APPLICATION

This application claims priority from Japanese Patent Application No. 2020-097646 filed with the Japan Patent Office on Jun. 4, 2020, the entire content of which is hereby incorporated by reference.

BACKGROUND

1. Technical Field

One aspect of the present disclosure relates to a torque damper apparatus and a torque converter including such a torque damper apparatus.

2. Description of Related Art

Typically, a torque converter is mainly provided between an engine and a transmission in a self-propelled vehicle (a so-called AT vehicle) including the automatic transmission. The torque converter is a mechanical apparatus configured such that hydraulic oil circulates between a pump impeller and a turbine runner arranged facing each other to amplify drive force from the engine and transmit the drive force to an output shaft side. In the torque converter, a torque damper apparatus including a coil spring for attenuating fluctuation (also referred to as "torque fluctuation") in the rotary drive force of the engine is provided. For example, in a damper apparatus as a torque damper apparatus disclosed in JP-A-2019-178720 described below, a balance weight is, for eliminating imbalance upon rotary drive, attached to a balance weight attachment hole formed at each of a first input plate and a second input plate.

SUMMARY

A torque damper apparatus includes: an input-side plate which includes a pair of side plates having a first side plate formed in an annular flat plate shape and an annular flat plate-shaped second side plate arranged facing the first side plate at a position apart from the first side plate and rotatably driven together with the first side plate and which is rotatably driven in response to drive force from a motor; an annular flat plate-shaped center plate coupled to an output shaft and arranged between the first side plate and the second side plate in a state in which the center plate is rotatable relative to both side plates; and an elastic transmission body which includes an elastic body and provided between the input-side plate and the center plate to transmit rotary drive force of the input-side plate to the center plate, in which the input-side plate has, at a plate surface of at least one of the first side plate or the second side plate, multiple weight attachment holes as through-holes for attaching a balance weight for adjusting balance of the input-side plate upon rotary drive, and each weight attachment hole is formed in a long hole shape extending along a circumferential direction at an outer edge portion of the side plate, which is provided with the weight attachment holes, adjacent to an outer peripheral end portion thereof.

DETAILED DESCRIPTION

Figure 1:
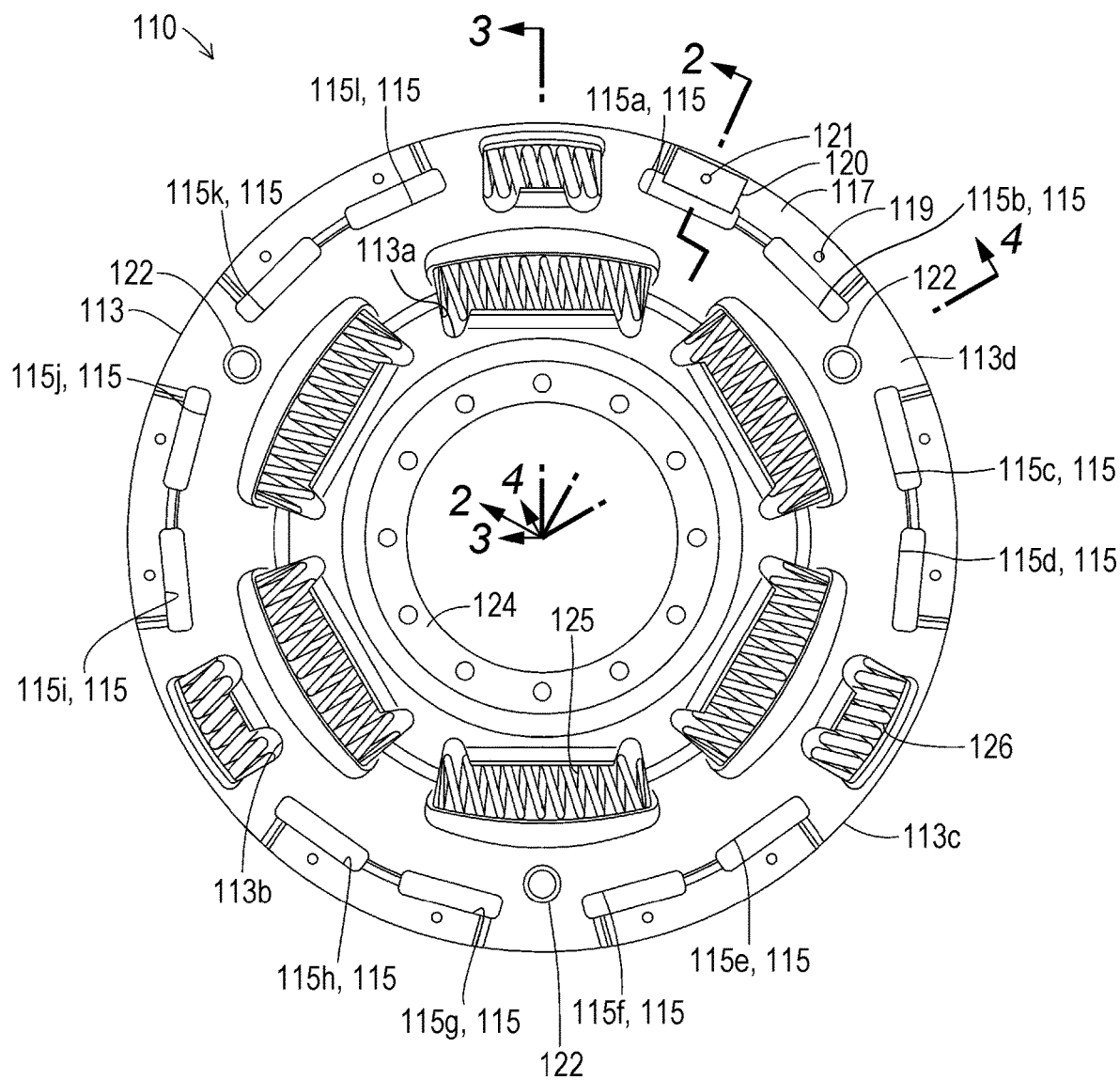
FIG. 1 is a front view schematically showing a configuration of a torque damper apparatus in a torque converter according to one embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the torque damper apparatus described in JP-A-2019-178720 above, it is difficult to attach the balance weight to a position other than a particular position at the balance weight attachment hole. For this reason, it is difficult to perform an adjustment process for eliminating imbalance of the first input plate and the second input plate upon rotary drive.

One object of the present disclosure is to provide a torque damper apparatus and a torque converter configured so that an adjustment process for eliminating imbalance of an input-side plate to be rotatably driven can be facilitated.

A torque damper apparatus according to an aspect of the present disclosure (this torque damper apparatus) includes: an input-side plate which includes a pair of side plates having a first side plate formed in an annular flat plate shape and an annular flat plate-shaped second side plate arranged facing the first side plate at a position apart from the first side plate and rotatably driven together with the first side plate and which is rotatably driven in response to drive force from a motor; an annular flat plate-shaped center plate coupled to an output shaft and arranged between the first side plate and the second side plate in a state in which the center plate is rotatable relative to both side plates; and an elastic transmission body which includes an elastic body and provided between the input-side plate and the center plate to transmit rotary drive force of the input-side plate to the center plate, in which the input-side plate has, at a plate surface of at least one of the first side plate or the second side plate, multiple weight attachment holes as through-holes for attaching a balance weight for adjusting balance of the input-side plate upon rotary drive, and each weight attachment hole is formed in a long hole shape extending along a circumferential direction at an outer edge portion of the side plate, which is provided with the weight attachment holes, adjacent to an outer peripheral end portion thereof.

In the present torque damper apparatus, each weight attachment hole is formed in the long hole shape extending in the circumferential direction at the outer edge portion of the side plate. Thus, an attachment position of the balance weight can be adjusted along the circumferential direction. Further, the size of the balance weight to be attached to the weight attachment hole can be also selected. Thus, the adjustment process for eliminating imbalance of the input-side plate to be rotatably driven can be facilitated. In this case, the balance weight may be attached to the weight attachment hole with the balance weight being positioned between the weight attachment hole and the outer peripheral end portion of the side plate. With this configuration, the balance weight can be positioned at the outermost edge portion of the side plate, and therefore, great inertia force can be produced even with a balance weight with a slight weight. Note that the length of the long hole in one direction is longer than a length in a width direction perpendicular to the one direction. That is, the long hole is a through-hole elongated as a whole.

In the torque damper apparatus, each weight attachment hole may be formed with a length of equal to or greater than an angle range of 10° about a center of rotation of the side plate provided with the weight attachment holes.

In this case, in the present torque damper apparatus, each weight attachment hole is formed with a length of equal to or greater than an angle range of 10° about the center of rotation of the side plate. Thus, the range of adjustment of the attachment position of the balance weight in the circumferential direction and the range of choice of the size of the balance weight attachable to the weight attachment hole can be expanded. Consequently, the adjustment process for eliminating the imbalance of the input-side plate can be easily performed with high accuracy.

In the torque damper apparatus, the weight attachment holes may be formed such that openings of the weight attachment holes overlap with each other at positions symmetrical about a center of rotation of the side plate provided with the weight attachment holes.

In this case, in the present torque damper apparatus, the weight attachment holes are formed such that the openings of the weight attachment holes overlap with each other at the positions symmetrical about the center of rotation of the side plate. Thus, the process of adjusting balance in a radial direction through the center of rotation of the input-side plate can be easily performed with high accuracy.

Further, in the torque damper apparatus, each weight attachment hole is formed in a linear long hole shape along a circumferential direction of the side plate provided with the weight attachment holes.

In this case, in the torque damper apparatus, each weight attachment hole is formed in the linear long hole shape along the circumferential direction of the side plate. Thus, as compared to the case of forming the weight attachment hole in a curved shape along the circumferential direction, the balance weight is easily shared by torque damper apparatuses with different sizes.

Further, in the torque damper apparatus, the input-side plate may have a projecting portion formed in such a manner that part of a periphery of each of the first and second side plates projects in an axial direction of the side plates.

In this case, in the torque damper apparatus, the input-side plate has the projecting portion formed in such a manner that part of the periphery of the side plate projects in the axial direction of the side plate. Thus, stiffness of the weight attachment hole formed in the long hole shape and the outer edge portion of the side plate provided with such a weight attachment hole can be improved.

Further, in the torque damper apparatus, the input-side plate may be provided in a housing space housing hydraulic oil, and have a side plate opposing through-hole as a through-hole formed at a portion of the first side plate or the second side plate facing each weight attachment hole, and the center plate may have a center plate opposing through-hole as a through-hole formed at a portion facing each weight attachment hole and each side plate opposing through-hole.

In this case, in the present torque damper apparatus, the side plate opposing through-hole is formed at the portion of the first side plate or the second side plate facing each weight attachment hole. Further, the center plate opposing through-hole is formed at the portion of the center plate facing each weight attachment hole and each side plate opposing through-hole. With this configuration, in the present torque damper apparatus, blocking of hydraulic oil flowing on the input-side plate and the center plate in the axial direction is reduced, and therefore, the hydraulic oil flows with the hydraulic oil directly penetrating the input-side plate and the center plate. Thus, fluidity of the hydraulic oil in a housing space housing the hydraulic oil is improved.

Further, in the torque damper apparatus, the input-side plate may be configured such that a length between two of the weight attachment holes adjacent to each other in a circumferential direction of the side plate provided with the weight attachment holes is shorter than a length of each of the two of the weight attachment holes in the circumferential direction.

In this case, in the present torque damper apparatus, the length between two of the weight attachment holes adjacent to each other in the circumferential direction of the side plate of the input-side plate is shorter than the length of each of these two weight attachment holes in the circumferential direction. Thus, a decrease in strength of the weight attachment hole and the side plate is suppressed and a wide range of the attachment position of the balance weight is ensured, and therefore, the imbalance can be eliminated by high-accuracy balance adjustment.

Further, in the torque damper apparatus, the input-side plate may include, at a periphery of each weight attachment hole, a weight fitting portion to be fitted to part of the balance weight for defining a position of the balance weight in each weight attachment hole.

In this case, in the present torque damper apparatus, the weight fitting portion to be fitted to part of the balance weight is, for defining the position of the balance weight in the weight attachment hole, formed at the periphery of the weight attachment hole at the input-side plate. Thus, shift of the position of the balance weight attached to the weight attachment hole can be reduced while the balance weight can be stably attached to the weight attachment hole. In this case, the weight fitting portion may be, for example, a through-hole or a recessed portion to be fitted to part of the balance weight. Alternatively, a single weight fitting portion or multiple weight fitting portions may be provided at a single weight attachment hole.

In the present torque damper apparatus, the balance weight may be formed in a clip shape sandwiching the side plate provided with the weight attachment holes.

In this case, in the present torque damper apparatus, the balance weight is formed in the clip shape sandwiching the side plate. Thus, favorable workability in attachment of the balance weight to the weight attachment hole, adjustment of the position of the balance weight in the weight attachment hole, and detachment of the balance weight from the weight attachment hole can be achieved.

The aspect of the present disclosure is not limited to implementation as the torque damper apparatus, and can be also implemented as a torque converter including the torque damper apparatus.

Specifically, it is preferred that a torque converter according to the present disclosure (this torque converter) includes: a torque converter cover forming a housing space housing hydraulic oil, having, in the housing space, a pump impeller configured to cause a hydraulic oil flow, and rotatably driven by drive force of a motor together with the pump impeller; a turbine runner arranged facing the pump impeller and rotatably driven by the hydraulic oil flow to rotatably drive an output shaft; and the torque damper apparatus described above.

The present torque converter having such a configuration can produce features and advantageous effects similar to those of the present torque damper apparatus.

Further, the torque converter may further include: a clutch apparatus configured to transmit rotary drive force of the torque converter cover to the input-side plate of the torque damper apparatus or block the transmission, in which the input-side plate is rotatably driven in response to the drive force from the motor through each of the torque converter cover and the clutch apparatus.

Figure 2:
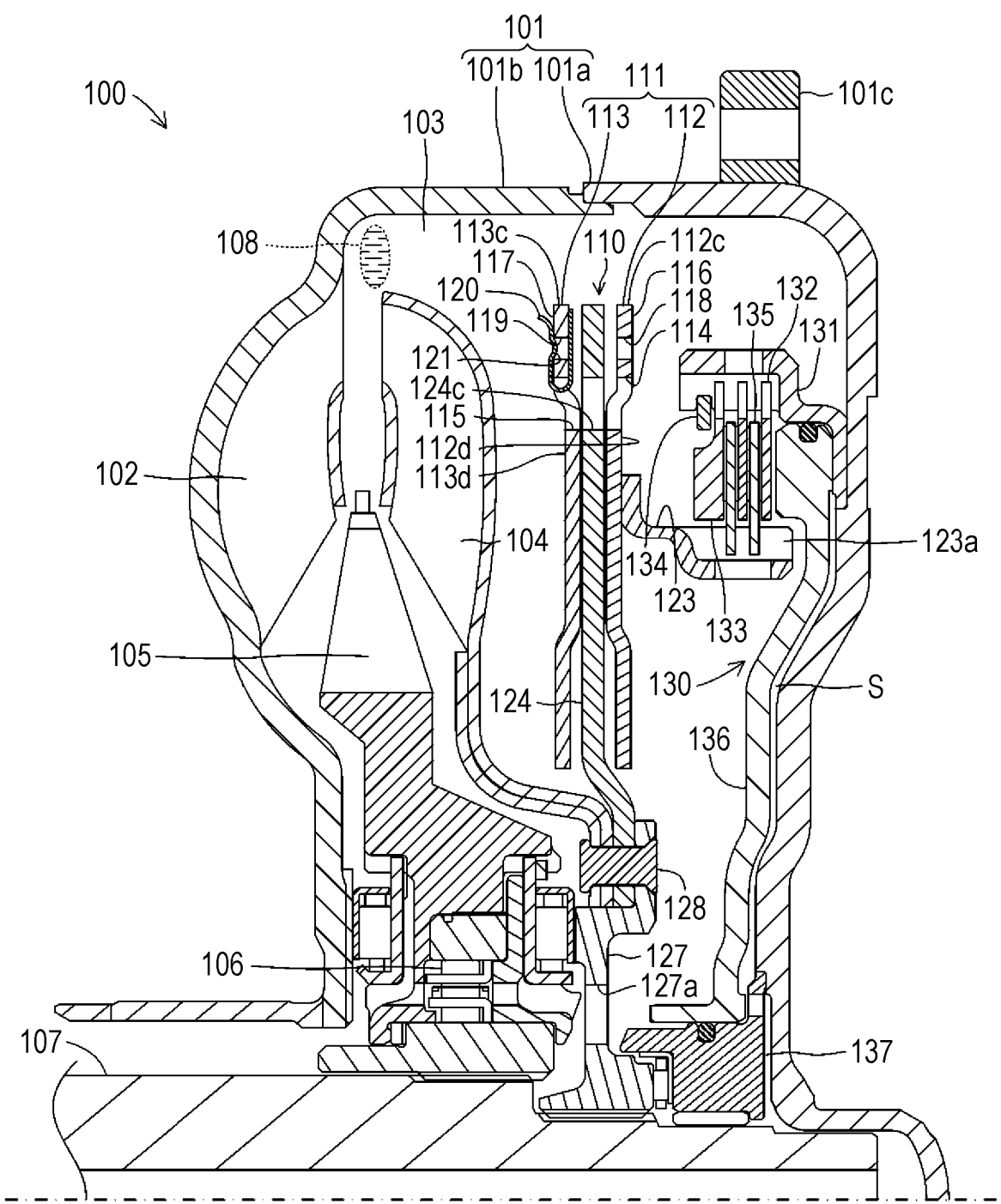
FIG. 2 is a sectional view along a 2-2 line shown in FIG. 1, FIG. 2 schematically showing a configuration of the torque converter including the torque damper apparatus.
Figure 3:
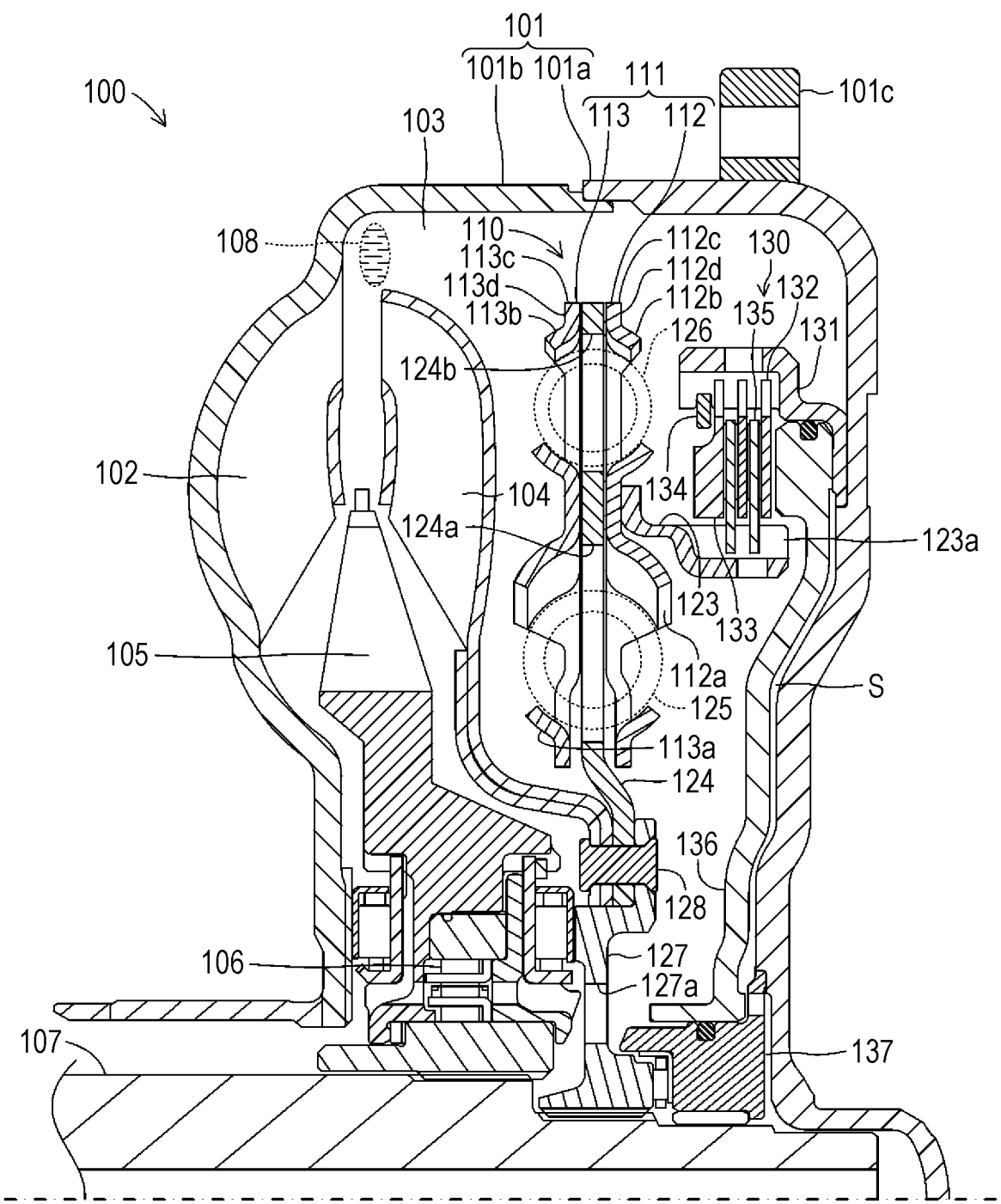
FIG. 3 is a sectional view along a 3-3 line shown in FIG. 1, FIG. 3 schematically showing the configuration of the torque converter including the torque damper apparatus.
Figure 4:
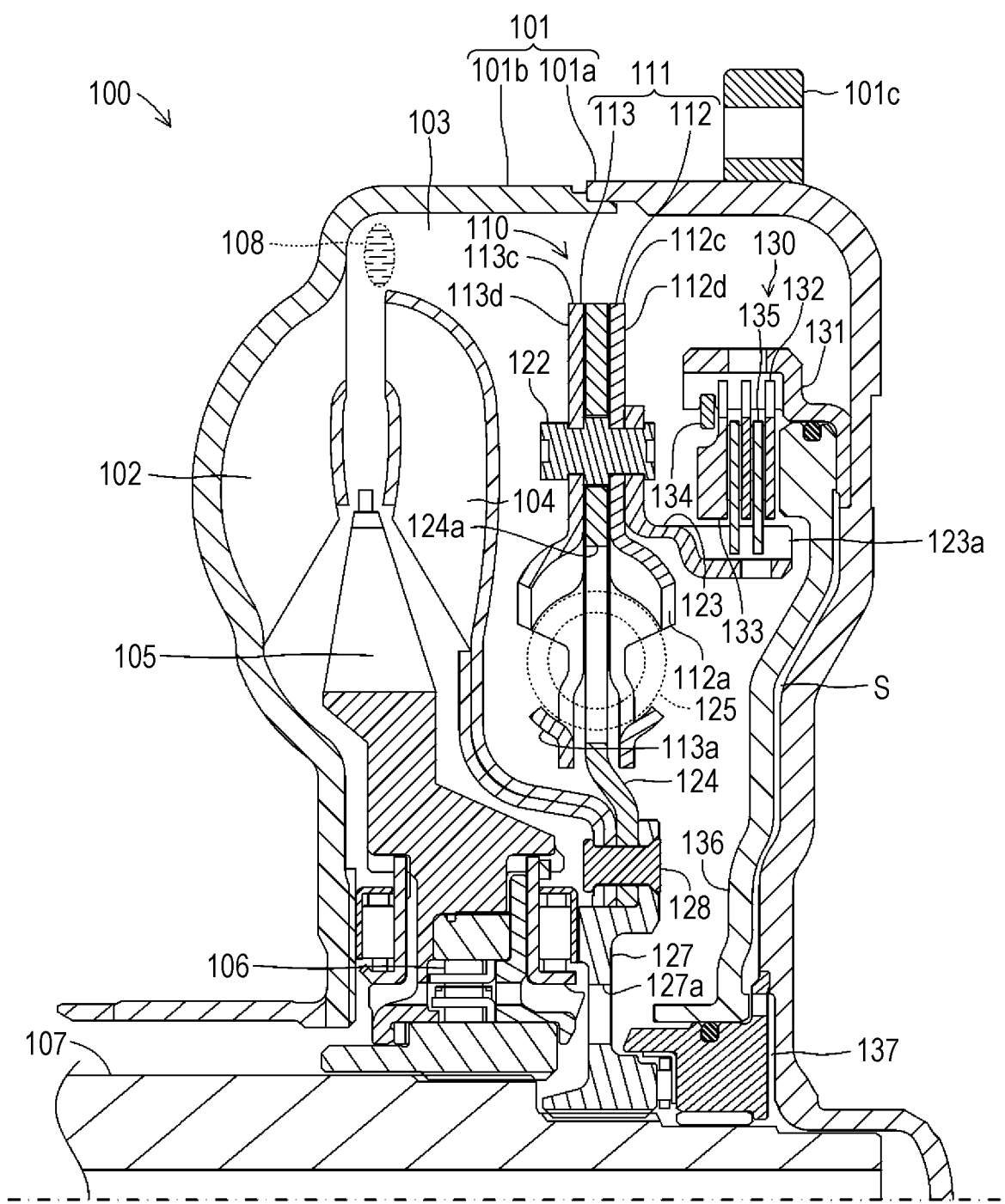
FIG. 4 is a sectional view along a 4-4 line shown in FIG. 1, FIG. 4 schematically showing the configuration of the torque converter including the torque damper apparatus.

Hereinafter, one embodiment of a torque converter including a torque damper apparatus according to the present disclosure will be described with reference to the drawings. FIG. 1 is a front view schematically showing a configuration of the torque damper apparatus 110 in the torque converter 100 according to one embodiment of the present disclosure. Moreover, FIG. 2 is a sectional view along a 2-2 line shown in FIG. 1, FIG. 2 schematically showing a configuration of the torque converter 100 including the torque damper apparatus 110. Further, FIG. 3 is a sectional view along a 3-3 line shown in FIG. 1, FIG. 3 schematically showing the configuration of the torque converter 100 including the torque damper apparatus 110. In addition, FIG. 4 is a sectional view along a 4-4 line shown in FIG. 1, FIG. 4 schematically showing the configuration of the torque converter 100 including the torque damper apparatus 110. The torque converter 100 is a mechanical apparatus mainly provided between an engine and a transmission in an automobile (a so-called AT or CVT vehicle) including the automatic transmission and configured to amplify drive force of the engine to transmit the drive force to the transmission.

(Configuration of Torque Converter 100)

The torque converter 100 includes a torque converter cover 101. The torque converter cover 101 is a component to be rotatably driven by the drive force from the engine (a motor) of the not-shown vehicle. The torque converter cover 101 mainly has an input-side half 101a and a pump-side half 101b. The input-side half 101a is a component forming part of the torque converter cover 101. The input-side half 101a is formed in a substantially cup shape, and has a metal discoid outer edge portion extending in a bent form. A back surface (a right side surface as viewed in the figure) of the input-side half 101a is coupled to a not-shown crankshaft extending from the engine through a coupling component 101c. The pump-side half 101b is connected to the above-described bent outer edge portion.

The pump-side half 101b is a metal component forming another part of the torque converter cover 101. The pump-side half 101b is formed in a cylindrical shape having a substantially cup-shaped portion fitted to the input-side half 101a. A pump impeller 102 is provided on an inner wall surface of the pump-side half 101b.

The pump impeller 102 is an impeller to be rotatably driven together with the torque converter cover 101 to send hydraulic oil 108 to a turbine runner 104. The pump impeller 102 is radially formed on the inner wall surface of the pump-side half 101b. The pump-side half 101b is attached to the input-side half 101a in a fixed manner in a state in which the pump-side half 101b is fitted to the input-side half 101a. With this configuration, a housing space 103 housing each of the hydraulic oil 108 and the pump impeller 102 is formed between the input-side half 101a and the pump-side half 101b, and the pump-side half 101b rotates together with the input-side half 101a.

As described above, the torque converter cover 101 forms the housing space 103 housing the hydraulic oil, and in the housing space 103, has the pump impeller 102 configured to cause a hydraulic oil flow. The torque converter cover 101 is rotatably driven together with the pump impeller 102 by the drive force of the engine (the motor) of the vehicle.

In addition to the hydraulic oil 108 and the pump impeller 102, each of the turbine runner 104, a stator 105, the torque damper apparatus 110, and a clutch mechanism 130 is provided in the housing space 103.

The turbine runner 104 is an impeller to be rotated by the flow of the hydraulic oil 108 caused by rotary drive of the pump impeller 102. The turbine runner 104 is arranged facing the pump impeller 102 in a state in which the turbine runner 104 is rotatable relative to the pump impeller 102. More specifically, the turbine runner 104 is, together with a later-described center plate 124, coupled to a turbine hub 127 through rivets 128.

The stator 105 is an impeller configured to rectify the flow of the hydraulic oil 108 flowing back from the turbine runner 104 to send such hydraulic oil 108 to the pump impeller 102. The stator 105 is attached to an output shaft 107 through a one-way clutch 106. The one-way clutch 106 is a component configured to support the stator 105 such that the stator 105 is rotatable only in the same direction as the direction of rotation of the turbine runner 104. The one-way clutch 106 is spline-fitted onto the output shaft 107 through a bearing.

The output shaft 107 is a component configured to output the rotary drive force of the torque converter 100 to the outside. The output shaft 107 is configured as a metal rod. In the present embodiment, the output shaft 107 is coupled to the not-shown transmission.

The hydraulic oil 108 is a substance (mineral oil) transmitting power between the pump impeller 102 and the turbine runner 104 and flowing in the housing space 103 to lubricate, cool, and wash each component provided in the housing space 103. The inside of the housing space 103 is filled with the hydraulic oil 108. The hydraulic oil 108 is supplied through the output shaft 107. The supply of the hydraulic oil 108 is controlled by a not-shown supply apparatus provided outside the torque converter 100. Note that the hydraulic oil 108 is indicated by a dashed circle in FIGS. 2 to 4.

The torque damper apparatus 110 is a mechanical apparatus directly coupling the pump impeller 102 and the turbine runner 104 to each other without the hydraulic oil 108. The torque damper apparatus 110 includes an input-side plate 111. The input-side plate 111 is a component to be rotatably driven by the rotary drive force transmitted from the input-side half 101a of the torque converter cover 101 through the clutch mechanism 130. The input-side plate 111 includes each of a first side plate 112 and a second side plate 113.

Figure 5:
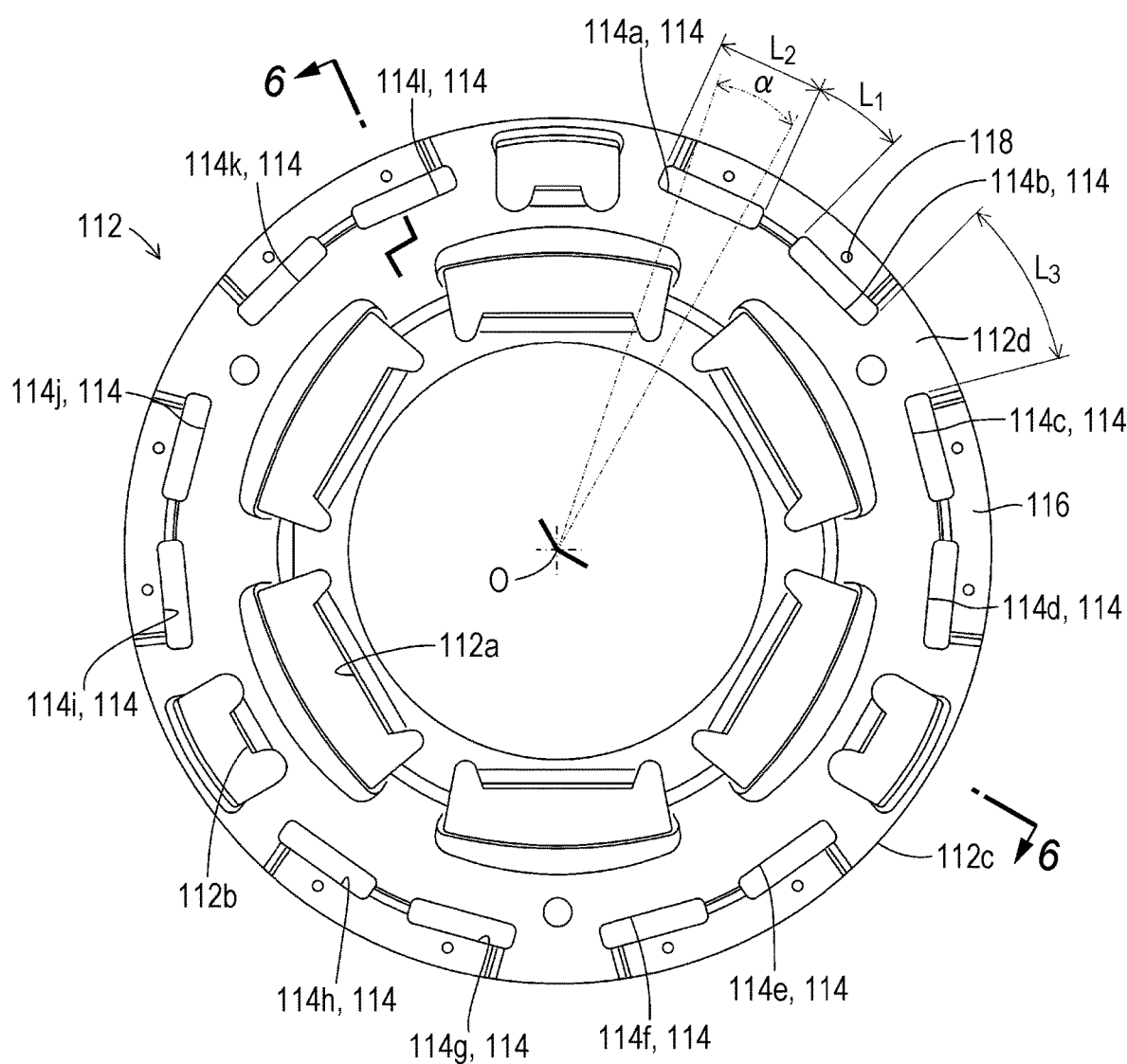
FIG. 5 is a front view showing an external configuration of a first side plate in the torque damper apparatus shown in each of FIGS. 2 to 4.
Figure 6:
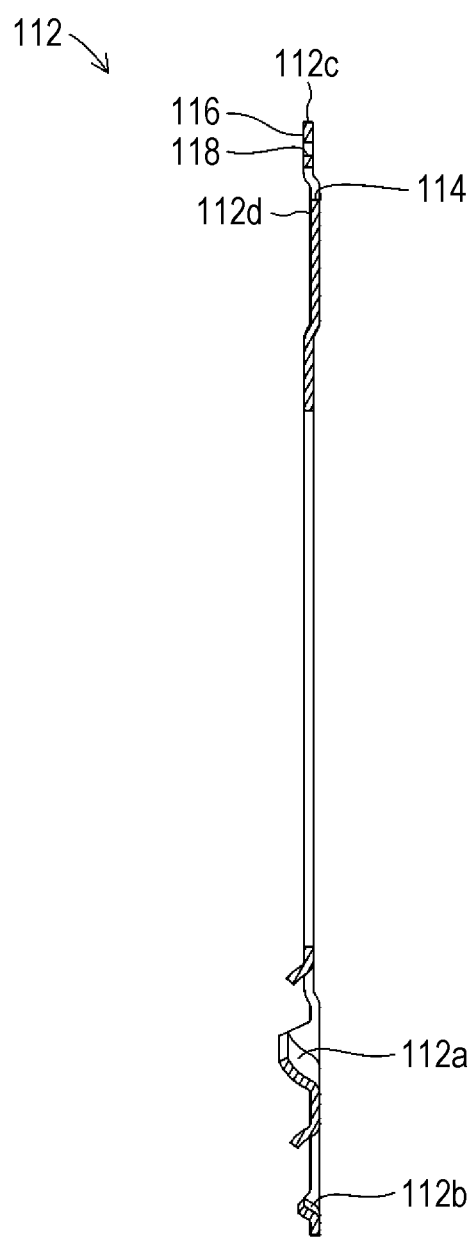
FIG. 6 is a sectional view of the first side plate along a 6-6 line shown in FIG. 5.

As shown in each of FIGS. 5 and 6, the first side plate 112 and the second side plate 113 are components configured to transmit the rotary drive force, which is transmitted from the input-side half 101a through the clutch mechanism 130, to the center plate 124 through each of inner peripheral side damper springs 125 and outer peripheral side damper springs 126. Each of the first side plate 112 and the second side plate 113 is formed in such a manner that a metal material is formed in an annular flat plate shape. That is, the input-side plate 111 has a pair of side plates including the first side plate 112 formed in the annular flat plate shape and the annular flat plate-shaped second side plate 113 arranged facing the first side plate 112 at a position apart from the first side plate 112 and rotatably driven together with the first side plate 112, and is rotatably driven in response to the drive force from the motor.

The first side plate 112 and the second side plate 113 are formed in the same shape. Specifically, inner peripheral side spring housing portions 112a, 113a, outer peripheral side spring housing portions 112b, 113b, weight attachment holes 114, 115, and projecting portions 116, 117 are mainly formed at each of the first side plate 112 and the second side plate 113. Note that FIGS. 5 and 6 show the first side plate 112. The second side plate 113 is also configured as in the shown first side plate 112.

The inner peripheral side spring housing portion 112a is a portion holding the inner peripheral side damper spring 125 together with the inner peripheral side spring housing portion 113a and an inner peripheral side spring housing portion 124a of the later-described center plate 124. The inner peripheral side spring housing portion 112a is formed in a substantially rectangular long hole shape extending along a circumferential direction of the first side plate 112. In this case, the inner peripheral side spring housing portion 112a is formed such that inner and outer portions of the first side plate 112 in a radial direction are raised in a curved shape from a plate surface of the first side plate 112 to hold the inner peripheral side damper spring 125. The multiple (six) inner peripheral side spring housing portions 112a are formed at equal intervals along the circumferential direction outside a through-hole formed at a center portion of the first side plate 112.

The outer peripheral side spring housing portion 112b is a portion holding the outer peripheral side damper spring 126 together with the outer peripheral side spring housing portion 113b and an outer peripheral side spring housing portion 124b of the center plate 124. The outer peripheral side spring housing portion 112b is formed in a substantially rectangular long hole shape extending along the circumferential direction of the first side plate 112. In this case, the outer peripheral side spring housing portion 112b is formed with a size smaller than that of the inner peripheral side spring housing portion 112a. The outer peripheral side spring housing portion 112b is formed such that inner and outer portions of the first side plate 112 in the radial direction are raised in a curved shape from the plate surface of the first side plate 112 to hold the outer peripheral side damper spring 126. The multiple (three) outer peripheral side spring housing portions 112b are formed at equal intervals along the circumferential direction at positions outside the inner peripheral side spring housing portions 112a.

The weight attachment hole 114 is a portion (a through-hole) for attaching a balance weight 120. The weight attachment hole 114 is formed in a substantially rectangular long hole shape extending along the circumferential direction of the first side plate 112. That is, the weight attachment hole 114 is, at an outer edge portion of the first side plate 112 adjacent to an outer peripheral end portion thereof, formed in the long hole shape extending along the circumferential direction. Specifically, the weight attachment hole 114 is formed in a linear long hole shape along the circumferential direction of the first side plate 112. In this case, the weight attachment hole 114 is formed such that the length of the weight attachment hole 114 in the circumferential direction is a length of equal to or greater than an angle range $\alpha$ of $10°$ about the center O of rotation of the first side plate 112. An opening of the weight attachment hole 114 is formed with such a size that the opening is not closed but is exposed to the outside in a state in which the balance weight 120 is attached to the weight attachment hole 114.

The multiple weight attachment holes 114 are formed and arranged in an annular shape at the annular outer edge portion 112d of the first side plate 112 adjacent to the outer peripheral end portion 112c thereof. In the present embodiment, 12 weight attachment holes 114a to 114l are, as the weight attachment holes 114, formed and arranged in the annular shape along the outer edge portion 112d of the first side plate 112.

In this case, the weight attachment holes 114a to 114l are formed such that any ones of the openings of the weight attachment holes 114a to 114l overlap with each other at positions symmetrical about the center O of rotation of the first side plate 112. For example, the weight attachment holes 114a to 114l are formed such that the opening of one of the weight attachment holes 114a to 114l overlaps with one of the positions symmetrical about the center O of rotation of the first side plate 112 and another one of the weight attachment holes 114a to 114l overlaps with the other position. For example, in the present embodiment, the weight attachment hole 114g is formed on the opposite side of the center O of rotation from the weight attachment hole 114a in the radial direction. In this case, the weight attachment hole 114a and the weight attachment hole 114g are formed such that the openings thereof at least partially overlap with each other through the center O of rotation. In other words, the weight attachment hole 114a and the weight attachment hole 114g are formed such that the openings overlap with each other when the position of one of the weight attachment holes is shifted by $180°$ about the center O of rotation.

Note that in the present embodiment, the weight attachment hole 114b and the weight attachment hole 114h, the weight attachment hole 114c and the weight attachment hole 114i, the weight attachment hole 114d and the weight attachment hole 114j, the weight attachment hole 114e and the weight attachment hole 114k, and the weight attachment hole 114f and the weight attachment hole 114l are formed as in the weight attachment hole 114a and the weight attachment hole 114g.

Some of the weight attachment holes 114a to 114l are arranged close to each other such that a length L1 between adjacent two of the weight attachment holes 114a to 114l is shorter than the length L2 of each of these two weight attachment holes 114a to 114l in the circumferential direction. For example, in the present embodiment, the weight attachment hole 114a and the weight attachment hole 114b are arranged such that the length L1 between these holes is shorter than the length L2 of each of the weight attachment hole 114a and the weight attachment hole 114b.

Note that in the present embodiment, the weight attachment hole 114c and the weight attachment hole 114d, the weight attachment hole 114e and the weight attachment hole 114f, the weight attachment hole 114g and the weight attachment hole 114h, the weight attachment hole 114i and the weight attachment hole 114j, and the weight attachment hole 114k and the weight attachment hole 114l are also arranged close to each other as in the weight attachment hole 114a and the weight attachment hole 114b.

In this case, a length L3 between a pair of weight attachment holes 114a to 114l arranged adjacent to each other and an adjacent pair of weight attachment holes 114a to 114l is set to a length longer than the length L1 and equal to or longer than the length L2. That is, a weight attachment hole pair including two of the weight attachment holes 114a to 114l arranged adjacent to each other is arranged distant from another weight attachment hole pair.

The projecting portion 116 is formed at the periphery of some of the weight attachment holes 114a to 114l. The projecting portion 116 is a portion improving stiffness of the first side plate 112 and forming an attachment portion of the balance weight 120. The projecting portion 116 is formed at the outer edge portion 112d of the first side plate 112. More specifically, the projecting portion 116 is formed at an outer portion in the radial direction at the periphery of the weight attachment holes 114a to 114l in a state in which the projecting portion 116 is raised in a platform shape in an axial direction. In this case, the projecting portion 116 is formed to extend over two of the weight attachment holes 114a to 114l arranged adjacent to each other as described above. As described above, the input-side plate 111 has the projecting portions formed in such a manner that the peripheral portion of the first side plate 112 partially projects in the axial direction of the first side plate 112.

That is, in the present embodiment, the six projecting portions 116 are formed at equal intervals along the circumferential direction of the first side plate 112. The amount of projection of the projecting portion 116 may be set to equal to or greater than the plate thickness of the balance weight 120. In this case, interference with the flow of the hydraulic oil 108 in a clearance between the first side plate 112 and the center plate 124 can be reduced. Each of these projecting portions 116 is formed in such a manner that the first side plate 112 is plastically deformed by pressing. A weight fitting portion 118 is formed at each projecting portion 116.

The weight fitting portion 118 is a portion defining an attachment position of the balance weight 120 to be attached to the first side plate 112. The weight fitting portion 118 is formed as a through-hole to which a plate fitting portion 121 of the balance weight 120 is to be fitted. As described above, the input-side plate 111 includes, at the periphery of the weight attachment holes 114, the weight fitting portions 118 to be fitted to part of the balance weight 120 for defining the position of the balance weight 120 in the weight attachment hole 114.

The weight fitting portion 118 is formed at a center portion of each of the projecting portions 116 in the circumferential direction of the weight attachment holes 114a to 114l. In the present embodiment, the single weight fitting portion 118 is formed at each of the weight attachment holes 114a to 114l. On this point, two or more weight fitting portions 118 may be formed at each of the weight attachment holes 114a to 114l, needless to say.

The inner peripheral side spring housing portion 113a, the outer peripheral side spring housing portion 113b, the weight attachment hole 115, 115a to 115l, the projecting portion 117, and a weight fitting portion 119 formed at the second side plate 113 have the substantially same configurations as those of the inner peripheral side spring housing portion 112a, the outer peripheral side spring housing portion 112b, the weight attachment hole 114, 114a to 114l, the projecting portion 116, and the weight fitting portion 118, and therefore, description thereof will be omitted.

Figure 7A:
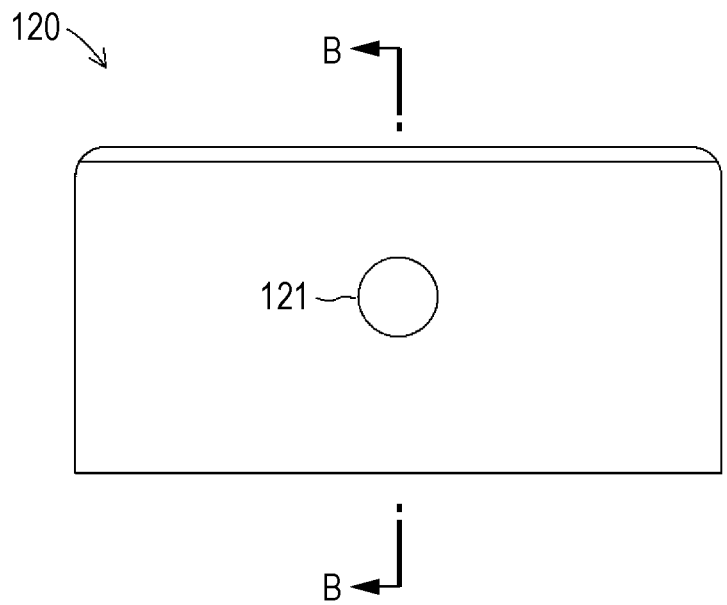
FIGS. 7A and 7B show an external configuration of a balance weight in the torque damper apparatus shown in each of FIGS. 1 and 2, FIG. 7A being a front view of the balance weight and FIG. 7B being a sectional view of the balance weight along a B-B line shown in FIG. 7A.
Figure 7B:
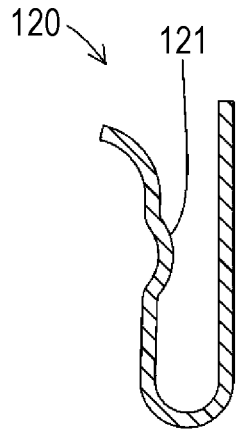

As shown in each of FIGS. 7A and 7B, the balance weight 120 is a component for eliminating dynamic imbalance of the input-side plate 111 upon rotary drive, i.e., a component for adjusting balance of the input-side plate 111 upon rotary drive. The balance weight 120 is formed in a clip shape in such a manner that a metal plate member is bent in a U-shape. That is, the balance weight 120 is configured to sandwich the projecting portion 116, 117 from the inside of the weight attachment hole 114, 115. That is, the balance weight 120 is formed in the clip shape sandwiching the first side plate 112 and/or the second side plate 113. The plate fitting portion 121 is formed at an inner surface of the balance weight 120.

The plate fitting portion 121 is a portion to be fitted to the weight fitting portion 118, 119 formed at the projecting portion 116, 117 and provided for stabilizing an attachment state of the balance weight 120. The plate fitting portion 121 is formed to protrude in a raised hemispherical shape from the inner surface of the balance weight 120. In the present embodiment, the single plate fitting portion 121 is formed at the single balance weight 120. On this point, two or more plate fitting portions 121 may be formed at the single balance weight 120, needless to say.

The balance weights 120 with various sizes and weights are prepared in advance. A worker manufacturing the torque damper apparatus 110 attaches, according to a dynamic imbalance state of the input-side plate 111 upon rotary drive, the proper balance weight 120 to the projecting portion(s) 116, 117 of the first side plate 112 and/or the second side plate 113. Thus, the attachment position of the balance weight 120 at the torque damper apparatus 110 and the number of balance weights 120 to be attached vary according to the torque damper apparatus 110. In some cases, no balance weight 120 is attached to the torque damper apparatus 110. Note that FIG. 2 shows a state in which the balance weight 120 is attached to the second side plate 113.

The first side plate 112 and the second side plate 113 are integrated with three rivets 122 in a state in which the center plate 124 is sandwiched in the axial direction between the first side plate 112 and the second side plate 113, thereby forming the input-side plate 111. In this case, a clutch coupling plate 123 is coupled to the first side plate 112 of the input-side plate 111 through the rivets 122.

The clutch coupling plate 123 is a component to be rotatably driven by the rotary drive force transmitted from the input-side half 101a of the torque converter cover 101 through the clutch mechanism 130. The clutch coupling plate 123 has a planar circular ring portion, and is formed in a circular ring shape as viewed in plane.

A tubular clutch plate holding portion 123a is formed in such a manner that an outer portion of an inner edge portion of the clutch coupling plate 123 in the radial direction is bent to a clutch mechanism 130 side. Further, an outer edge portion of the clutch coupling plate 123 is coupled to the plate surface of the first side plate 112 through the rivets 122. The clutch plate holding portion 123a is a portion holding later-described driven-side clutch plates 135 in a state in which the driven-side clutch plates 135 are displaceable along an axis direction of the clutch coupling plate 123 and are rotatable together with the clutch coupling plate 123. The clutch plate holding portion 123a has an external gear-shaped spline.

The center plate 124 is a component to be rotatably driven by the rotary drive force received from the input-side plate 111 through each of the inner peripheral side damper springs 125 and the outer peripheral side damper springs 126. The center plate 124 is formed as a circular ring-shaped plate body. An inner edge portion of the center plate 124 is integrally fixed to the turbine hub 127. The center plate 124 is coupled to each of the first side plate 112 and the second side plate 113 in a state in which the center plate 124 is relatively displaceable in the circumferential direction between the first side plate 112 and the second side plate 113. That is, the center plate 124 is coupled to the output shaft 107, and is formed in an annular flat plate shape. The center plate 124 is arranged between the first side plate 112 and the second side plate 113 in a state in which the center plate 124 is rotatable relative to the first side plate 112 and the second side plate 113.

Each of the six inner peripheral side spring housing portions 124a, the three outer peripheral side spring housing portions 124b, and 12 center plate opposing through-holes 124c is formed at the center plate 124. That is, the center plate 124 has the center plate opposing through-holes 124c as through-holes formed at portions facing the weight attachment holes 114, 115 as side plate opposing through-holes.

The inner peripheral side spring housing portion 124a is a through-hole for housing the inner peripheral side damper spring 125. The inner peripheral side spring housing portion 124a is formed in a substantially quadrangular long hole shape extending along the circumferential direction of the center plate 124. These inner peripheral side spring housing portions 124a are formed at positions facing the inner peripheral side spring housing portions 112a, 113a.

The outer peripheral side spring housing portion 124b is a through-hole for housing the outer peripheral side damper spring 126. The outer peripheral side spring housing portion 124b is formed in a substantially quadrangular long hole shape extending along the circumferential direction of the center plate 124. These outer peripheral side spring housing portions 124b are formed at positions facing the outer peripheral side spring housing portions 112b, 113b.

The center plate opposing through-hole 124c is a portion for improving fluidity of the hydraulic oil 108, with which the inside of the housing space 103 is filled, in the housing space 103. The center plate opposing through-hole 124c is formed as a through-hole penetrating the center plate 124 in the axial direction. The center plate opposing through-hole 124c is formed to have the same size and shape as those of the weight attachment holes 114, 115 at a position facing these weight attachment holes 114, 115.

The inner peripheral side damper spring 125 is a component (an elastic transmission body) configured to transmit, together with the outer peripheral side damper spring 126, the rotary drive force transmitted from the input-side plate 111 to the center plate 124 while attenuating fluctuation in such rotary drive force. The inner peripheral side damper spring 125 includes a copper coil spring (an elastic body). The outer peripheral side damper spring 126 is a component (an elastic transmission body) configured to transmit, together with the inner peripheral side damper spring 125, the rotary drive force transmitted from the input-side plate 111 to the center plate 124 while attenuating fluctuation in such rotary drive force. The outer peripheral side damper spring 126 includes a copper coil spring (an elastic body). That is, the inner peripheral side damper spring 125 and the outer peripheral side damper spring 126 are elastic transmission bodies including the elastic bodies and provided between the input-side plate 111 and the center plate 124 to transmit the rotary drive force of the input-side plate 111 to the center plate 124.

The inner peripheral side damper spring 125 and the outer peripheral side damper spring 126 are formed to have different wire diameters, thicknesses, and lengths and have different spring properties. Needless to say, the inner peripheral side damper spring 125 and the outer peripheral side damper spring 126 may be formed to have the same spring properties. In FIG. 3, each of the inner peripheral side damper spring 125 and the outer peripheral side damper spring 126 is indicated by a chain double-dashed line. In FIG. 4, the inner peripheral side damper spring 125 is indicated by a chain double-dashed line.

The turbine hub 127 is a metal component for transmitting the rotary drive force of each of the turbine runner 104 and the center plate 124 to the output shaft 107. The turbine hub 127 is formed in such a flange shape that a discoid body projects from an outer peripheral surface of a cylindrical body. An internal gear-shaped spline is formed at an inner peripheral portion of the turbine hub 127, and such an inner peripheral portion is spline-fitted to the output shaft 107. Further, each of the inner edge portions of the turbine runner 104 and the center plate 124 is coupled to an outer peripheral portion of the turbine hub 127 through the rivets 128. In addition, multiple distribution holes 127a are, at the turbine hub 127, formed as through-holes for causing the flow of the hydraulic oil 108 in the axial direction.

The clutch mechanism 130 is a mechanical apparatus configured to transmit the rotary drive force, which is transmitted from the engine to the torque converter cover 101, to the torque damper apparatus 110 or block such transmission. That is, the clutch mechanism 130 is a clutch apparatus, and is configured to transmit the rotary drive force of the torque converter cover 101 to the input-side plate 111 of the torque damper apparatus 110 or block such transmission. The input-side plate 111 is rotatably driven by receiving the drive force from the engine (the motor) through each of the torque converter cover 101 and the clutch mechanism 130. The clutch mechanism 130 includes a clutch plate holding body 131.

The clutch plate holding body 131 is a component holding multiple (two in the present embodiment) drive-side clutch plates 132 and a stopper plate 133 while housing an outer edge portion of a later-described clutch piston 136. The clutch plate holding body 131 is formed in such a manner that a metal material is formed in a cylindrical shape. The clutch plate holding body 131 is configured such that one (the right side as viewed in the figure) end portion of the clutch plate holding body 131 is attached to an inner wall portion of the input-side half 101a of the torque converter cover 101 in a fixed manner, and is rotatably driven together with the torque converter cover 101.

An internal gear-shaped spline is formed at an inner peripheral portion of the clutch plate holding body 131. The clutch plate holding body 131 holds, through such a spline, the multiple drive-side clutch plates 132 and the single stopper plate 133 in a state in which these plates are displaceable along an axis direction of the clutch plate holding body 131 and are rotatable together with the clutch plate holding body 131.

The drive-side clutch plate 132 is an annular flat plate-shaped component to be pressed against the later-described driven-side clutch plate 135. The drive-side clutch plate 132 is formed in such a manner that a thin plate member made of a steel plate cold commercial (SPCC) material is punched in an annular shape. In this case, an external gear-shaped spline to be fitted to the spline formed at the inner peripheral portion of the clutch plate holding body 131 is formed at an outer peripheral portion of the drive-side clutch plate 132. The drive-side clutch plates 132 and the two driven-side clutch plates 135 are alternately arranged in the clutch plate holding body 131.

The stopper plate 133 is a component for sandwiching, together with the clutch piston 136, the drive-side clutch plates 132 and the driven-side clutch plates 135. The stopper plate 133 is formed in such a manner that a metal material is formed in an annular flat plate shape. The stopper plate 133 is, at the inner peripheral portion of the clutch plate holding body 131, arranged on the left side with respect to the drive-side clutch plates 132 and the driven-side clutch plates 135 as viewed in the figure. Movement of the stopper plate 133 to the left side as viewed in the figure is restricted by a stopper 134 provided at a left end portion of the inner peripheral portion of the clutch plate holding body 131 as viewed in the figure.

The driven-side clutch plate 135 is an annular flat plate-shaped component to be pressed against the drive-side clutch plate 132. The driven-side clutch plate 135 is formed in such a manner that a thin plate member made of a steel plate cold commercial (SPCC) material is punched in an annular shape. An internal gear-shaped spline to be fitted to the spline formed at the clutch plate holding portion 123a as described above is formed at an inner peripheral portion of the driven-side clutch plate 135. That is, the clutch plate holding portion 123a forms part of the clutch mechanism 130.

The clutch piston 136 is a metal component, and causes the drive-side clutch plates 132 and the driven-side clutch plates 135 to closely contact each other or separate from each other in such a manner that the drive-side clutch plates 132 and the driven-side clutch plates 135 alternately arranged in the clutch plate holding body 131 are pressed against each other by the clutch piston 136 or are separated from each other by the clutch piston 136. The clutch piston 136 is formed in such a flange shape that a discoid body projects from an outer peripheral surface of a cylindrical body. The clutch piston 136 is supported such that a cylindrical inner peripheral portion thereof is rotatable relative to the output shaft 107 through a clutch hub 137.

A clearance S is ensured between the clutch piston 136 and the inner wall portion of the input-side half 101a of the torque converter cover 101. The hydraulic oil 108 is introduced into or flows out of the clearance S through the clutch hub 137, and accordingly, the clutch piston 136 approaches or separates from the drive-side clutch plates 132 and the driven-side clutch plates 135.

The clutch hub 137 is a component supporting the clutch piston 136 such that the clutch piston 136 is relatively rotatable on the output shaft 107. The clutch hub 137 is formed in such a manner that a metal material is formed in a cylindrical shape. An introduction hole for taking the hydraulic oil 108 for actuating the clutch piston 136 in or out of the clearance S is formed at the clutch hub 137.

(Process of Adjusting Balance in Torque Damper Apparatus 110)

Next, the process of adjusting balance in the torque damper apparatus 110 configured as described above will be described. First, the worker prepares each of the torque damper apparatus 110, the balance weight 120, and a not-shown balancing apparatus. The balancing apparatus described herein is a well-known mechanical apparatus, and rotatably drives the torque damper apparatus 110 to detect the dynamic imbalance state upon rotary drive.

Next, the worker rotatably drives the torque damper apparatus 110 with the torque damper apparatus 110 being gripped by the balancing apparatus, thereby grasping the imbalance state of the torque damper apparatus 110. Next, the worker attaches the balance weight 120 to such a position of the input-side plate 111 that the imbalance state of the torque damper apparatus 110 can be eliminated. Specifically, the worker can attach, according to effectiveness, the balance weight 120 to the weight attachment hole 114 of the first side plate 112 and/or the weight attachment hole 115 of the second side plate 113.

That is, in a case where attachment of the balance weight 120 is effective for eliminating the imbalance, the worker can freely select the balance weight 120 with a proper size (weight) and attach such a balance weight 120 to the weight attachment hole 114 and/or the weight attachment hole 115 at a proper position for eliminating the imbalance state. Since the projecting portions 116, 117 are formed in the torque damper apparatus 110, each of a clearance between the first side plate 112 and the center plate 124 and a clearance between the second side plate 113 and the center plate 124 is expanded. Thus, the worker can easily insert the balance weight 120 to the projecting portion 116, 117 or easily pull the balance weight 120 out of the projecting portion 116, 117. That is, the balance weight 120 is detachably attached to the input-side plate 111 so that the balance weight 120 can be detached not only upon assembly of the torque damper apparatus 110 but also upon maintenance.

In a case where the imbalance state of the torque damper apparatus 110 is eliminated, the worker detaches the torque damper apparatus 110 from the balancing apparatus, and manufactures the torque converter 100. The process of manufacturing the torque converter 100 does not directly relate to the present embodiment, and therefore, description thereof will be omitted.

(Actuation of Torque Converter 100)

Next, actuation of the torque converter 100 configured as described above will be described. The torque converter 100 functions in the so-called AT or CVT vehicle with the torque converter 100 being arranged between the engine and the transmission. Specifically, in the torque converter 100, the rotary drive force of the engine is first transmitted to the torque converter cover 101 by release of a brake and stepping on an accelerator pedal by a driver of the vehicle, and the torque converter cover 101 and the pump impeller 102 are rotatably driven together.

Subsequently, in the torque converter 100, the turbine runner 104 is rotatably driven in such a manner that the hydraulic oil 108 in the torque converter 100 circulates. Then, the rotary drive force of the turbine runner 104 is transmitted to the output shaft 107 through the turbine hub 127. Accordingly, the vehicle on which the torque converter 100 is mounted starts running.

Next, in the torque converter 100, the hydraulic oil 108 is, by acceleration operation by the driver, supplied to the clearance S between the inner wall portion of the input-side half 101a of the torque converter cover 101 and the clutch piston 136. Accordingly, the clutch piston 136 causes the drive-side clutch plates 132 and the driven-side clutch plates 135 to pressure-contact each other. Accordingly, the input-side plate 111 is coupled to the torque converter cover 101 through the clutch mechanism 130, and is rotatably driven together with the torque converter cover 101. Thus, the rotary drive force of the torque converter cover 101 is elastically transmitted to the center plate 124 through each of the inner peripheral side damper springs 125 and the outer peripheral side damper springs 126.

Accordingly, the output shaft 107 is rotatably driven by the rotary drive force transmitted from the center plate 124 through the turbine hub 127. That is, the torque converter 100 performs, at the initial stage of increasing the rotary drive force from the engine, transmission through fluid which is the hydraulic oil 108 flowing between the pump impeller 102 and the turbine runner 104. Thereafter, the torque converter cover 101 switches such torque transmission through the fluid to torque transmission by mechanical coupling through each of the clutch mechanism 130 and the torque damper apparatus 110. Accordingly, a lockup state in which the rotary drive force from the engine is continuously transmitted to the output shaft 107 is brought.

Upon rotary drive of the pump impeller 102 and the turbine runner 104 before and after the lockup state, the hydraulic oil 108 in the housing space 103 flows with intensity according to a rotary drive state. In the torque damper apparatus 110 described herein, the weight attachment holes 114, the center plate opposing through-holes 124c, and the weight attachment holes 115 are formed to penetrate the first side plate 112, the center plate 124, and the second side plate 113 in the axial direction at the same positions in the radial direction and the same positions in the circumferential direction. Thus, the fluidity of the hydraulic oil 108 between both sides of the torque damper apparatus 110 in the axial direction can be ensured. That is, the weight attachment holes 114, 115 also function as the side plate opposing through-holes according to one aspect of the present disclosure. That is, the input-side plate 111 is provided in the housing space 103 housing the hydraulic oil, and has the side plate opposing through-holes as through-holes formed at portions of the first side plate 112 or the second side plate 113 facing the weight attachment holes 114, 115.

In the torque converter 100, when the rotary drive force of the engine is decreased by deceleration operation by the driver of the vehicle, such as stepping on the brake or release of the accelerator pedal, the amount of relative displacement of the input-side plate 111 and the center plate 124 in the circumferential direction decreases. Moreover, in the torque converter 100, the hydraulic oil 108 flows out of the clearance S between the inner wall surface of the input-side half 101a of the torque converter cover 101 and the clutch piston 136. Accordingly, the clutch piston 136 separates from the drive-side clutch plates 132 and the driven-side clutch plates 135. Accordingly, in the torque converter 100, the lockup state is canceled, and the torque transmission state transitions to the torque transmission state through the fluid which is the hydraulic oil 108 flowing between the pump impeller 102 and the turbine runner 104.

As can be understood from description of actuation above, according to the above-described embodiment, in the torque converter 100, the weight attachment holes 114, 115 of the torque damper apparatus 110 are formed in the long hole shape extending along the circumferential direction at the outer edge portions 112d, 113d of the first side plate 112 and the second side plate 113. Thus, the size of the balance weight 120 can be freely selected. Consequently, the adjustment process for eliminating the imbalance of the input-side plate 111 to be rotatably driven can be facilitated. In this case, the balance weight 120 can be positioned between the weight attachment hole 114, 115 and the outer peripheral end portion 112c, 113c of the first side plate 112 or the second side plate 113, i.e., at an outermost edge portion of the first side plate 112 or the second side plate 113. Thus, great inertia force can be produced even with the balance weight 120 with a slight weight. Accordingly, the entirety of the torque converter 100 can be reduced in weight.

Further, implementation of the technique of the present disclosure is not limited to the above-described embodiment, and various changes can be made as in the following variations. Note that in description of each variation, the same reference numerals are used to represent portions similar to those of the above-described embodiment.

For example, in the above-described embodiment, the weight attachment holes 114, 115 are formed at each of the first side plate 112 and the second side plate 113. However, it may only be required that the weight attachment holes 114, 115 are formed at least at one of the first side plate 112 or the second side plate 113.

In the above-described embodiment, the 12 weight attachment holes 114, 115 are formed along the circumferential direction at each of the first side plate 112 and the second side plate 113. However, it may only be required that the multiple weight attachment holes 114, 115 are formed at least at one of the first side plate 112 or the second side plate 113. In this case, the weight attachment holes 114 formed at the first side plate 112 and the weight attachment holes 115 formed at the second side plate 113 may be different from each other in the number, the position, and/or the size. At least at one of the first side plate 112 or the second side plate 113, all of the weight attachment holes 114, 115 can be arranged at equal intervals or unequal intervals.

Thus, in the above-described embodiment, the weight attachment holes 114, 115 can be formed at the positions symmetrical about the center O of rotation at the first side plate 112 or the second side plate 113, or can be formed at positions asymmetrical about the center O of rotation. For example, three weight attachment holes 114, 115 can be formed at equal intervals along the circumferential direction at each of the first side plate 112 and the second side plate 113.

In the above-described embodiment, the weight attachment hole 114, 115 is formed with a length of equal to or greater than an angle range α of 10° about the center O of rotation of the first side plate 112. However, the weight attachment hole 114, 115 may be formed with a length of less than an angle range α of 10° about the center O of rotation of the first side plate 112, needless to say.

Of the weight attachment holes 114a to 114l described above in the embodiment, some holes are arranged close to each other (the same also applies to the weight attachment holes 115). With this configuration, a decrease in strength of the weight attachment holes 114, 115, the first side plate 112, and the second side plate 113 is suppressed and a wide range of the attachment position of the balance weight 120 is ensured in the torque damper apparatus 110, and therefore, the imbalance can be eliminated by high-accuracy balance adjustment. However, regarding the weight attachment holes 114, all of the weight attachment holes 114a to 114l may be arranged close to each other, or may be arranged distant from each other with a spacing longer than that of the close arrangement (the same also applies to the weight attachment holes 115). Note that in the torque damper apparatus 110, the close arrangement and the distant arrangement are mixed as an arrangement state of the weight attachment holes 114, 115 so that balance adjustment accuracy can be enhanced and balance between workability and ensuring of strength of the input-side plate 111 can be achieved.

In the above-described embodiment, the weight attachment hole 114, 115 is formed in the rectangular shape as viewed in plane. With this configuration, in the above-described embodiment, the balance weight 120 can be formed in a shape linearly extending along the linear sides of the weight attachment hole 114, 115. Thus, the balance weight 120 can be easily formed, and the balance weight 120 can be shared by the torque damper apparatuses 110 having different sizes. However, the weight attachment hole 114, 115 can be, for example, formed in a shape other than the rectangular shape as viewed in plane, such as an arc shape.

Figure 8:
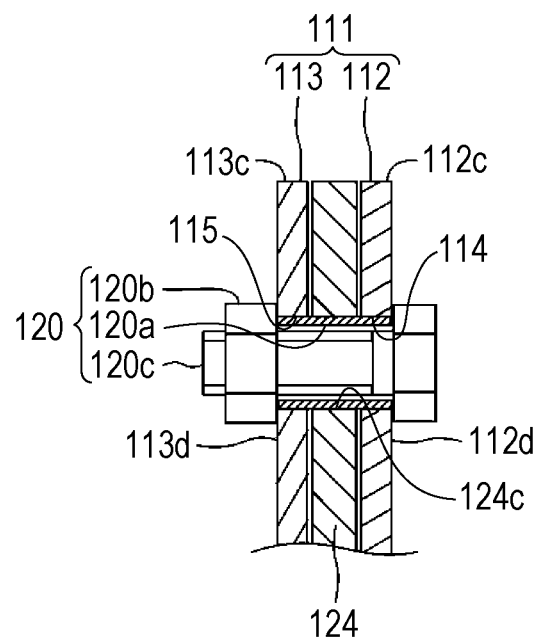
FIG. 8 is a partially-enlarged sectional view showing the outline of configurations of an input-side plate and a balance weight according to a variation of the present disclosure.

In the above-described embodiment, each of the first side plate 112 and the second side plate 113 is formed such that each projecting portion 116, 117 is formed at the periphery of some of the weight attachment holes 114, 115. However, each of the first side plate 112 and the second side plate 113 can be configured such that the projecting portion 116, 117 is continuously or intermittently formed at the entire periphery of the weight attachment holes 114, 115. Alternatively, each of the first side plate 112 and the second side plate 113 can be configured without the projecting portions 116, 117 as shown in FIG. 8. Note that in the case of providing the projecting portions 116, 117, the amount of projection of the projecting portion 116, 117 may be, needless to say, equal to or greater than the plate thickness of the balance weight 120 or less than the plate thickness.

In the above-described embodiment, each of the first side plate 112 and the second side plate 113 is configured such that the weight fitting portions 118, 119 are provided at such a plate. However, each of the first side plate 112 and the second side plate 113 can be configured without the weight fitting portions 118, 119. In this case, in the torque damper apparatus 110, the weight attachment holes 114, 115 are formed in the long hole shape, and therefore, the attachment position of the balance weight 120 can be adjusted in a longitudinal direction. Thus, the adjustment process for eliminating the imbalance of the input-side plate 111 can be facilitated. Note that needless to say, the balance weight 120 may be attached to a portion other than the outside of the weight attachment hole 114, 115 in the radial direction of the input-side plate 111, such as a portion inside the weight attachment hole 114, 115 in the radial direction or an end portion of the weight attachment hole 114, 115 in the circumferential direction.

In the above-described embodiment, the weight attachment hole 114, the weight attachment hole 115, and the center plate opposing through-hole 124c are formed in line in the axial direction at the same position in the circumferential direction at the input-side plate 111 and the center plate 124. In this case, a space where no physical component is present is formed between the weight attachment hole 114 and the center plate opposing through-hole 124c and between the weight attachment hole 115 and the center plate opposing through-hole 124c. With this configuration, in the torque damper apparatus 110, blocking of the hydraulic oil 108 flowing on the input-side plate 111 and the center plate 124 in the axial direction is reduced, and therefore, the hydraulic oil 108 flows with the hydraulic oil 108 directly penetrating the input-side plate 111 and the center plate 124. Thus, the fluidity of the hydraulic oil 108 in the housing space 103 housing the hydraulic oil 108 can be improved. However, the weight attachment hole 114, the weight attachment hole 115, and the center plate opposing through-hole 124c may be formed at different positions in the circumferential direction at the input-side plate 111 and the center plate 124. In this case, the flow of the hydraulic oil 108 can be also caused.

In the above-described embodiment, the weight attachment hole 114, 115 also functions as the side plate opposing through-hole according to one aspect of the present disclosure. However, the side plate opposing through-hole is not necessarily formed as the weight attachment hole 114, 115. The side plate opposing through-hole can be also configured as a through-hole configured such that the hydraulic oil 108 flows therein, but the balance weight 120 is not attached to such a through-hole.

In the above-described embodiment, the balance weight 120 is formed in the clip shape in such a manner that the plate member is bent in the U-shape. However, it may only be required that the balance weight 120 is formed in such a shape that the balance weight 120 can be attached to the weight attachment hole 114, 115. Thus, as shown in, e.g., FIG. 8, the balance weight 120 may include a cylindrical collar 120a, a bolt 120b penetrating the collar 120a, and a nut 120c screwed into the bolt 120b. The collar 120a penetrates the weight attachment holes 114, 115 and the center plate opposing through-hole 124c. Note that the center plate 124 may be formed with such a size that the outer diameter thereof is inside the positions of the weight attachment holes 114, 115. In this case, the center plate opposing through-hole 124c can be omitted. Alternatively, the balance weight 120 can be configured without the plate fitting portion 121.

In the above-described embodiment, the torque damper apparatus 110 is mounted on the torque converter 100. However, the torque damper apparatus 110 can be mounted on a mechanical apparatus other than the torque converter 100. For example, the torque damper apparatus 110 can be provided separately from the torque converter 100 on a power transmission path between the engine and the transmission. Alternatively, the torque damper apparatus 110 can be provided attached to the clutch configured to transmit the rotary drive force from the engine to the output shaft or block such transmission. In the above-described embodiment, the torque damper apparatus 110 is used as a wet torque damper apparatus arranged in the housing space 103 filled with the hydraulic oil 108. However, the torque damper apparatus 110 can be used as a dry torque damper apparatus not using the hydraulic oil 108.

It can be said that the technique of the present disclosure relates to a torque damper apparatus configured to absorb fluctuation in torque from a motor such as an engine and a torque converter including such a torque damper apparatus.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A torque damper apparatus comprising:
   an input-side plate which includes a pair of side plates having a first side plate formed in an annular flat plate shape and an annular flat plate-shaped second side plate arranged facing the first side plate at a position apart from the first side plate and rotatably driven together with the first side plate and which is rotatably driven in response to drive force from a motor;
   an annular flat plate-shaped center plate coupled to an output shaft and arranged between the first side plate and the second side plate in a state in which the center plate is rotatable relative to both side plates; and an elastic transmission body which includes an elastic body and provided between the input-side plate and the center plate to transmit rotary drive force of the input-side plate to the center plate, wherein the input-side plate has, at a plate surface of at least one of the first side plate or the second side plate, multiple weight attachment holes as through-holes for attaching a balance weight for adjusting balance of the input-side plate upon rotary drive, each weight attachment hole is elongated in a circumferential direction at an outer edge portion of the first side plate and the second side plate and forms an axial through-hole in the first and the second side plates, and the input-side plate includes, at a periphery of each weight attachment hole, a weight fitting portion to be fitted to part of the balance weight for defining a position of the balance weight in each weight attachment hole.

2. The torque damper apparatus according to claim 1, wherein
each weight attachment hole is formed with a length of equal to or greater than an angle range of 10° about a center of rotation of the first side plate and the second side plate provided with the weight attachment holes.

3. The torque damper apparatus according to claim 1, wherein
the weight attachment holes are formed such that openings of the weight attachment holes overlap with each other at positions symmetrical about a center of rotation of the first side plate and the second side plate provided with the weight attachment holes.

4. The torque damper apparatus according to claim 1, wherein
each weight attachment hole is formed in a linear long hole shape along the circumferential direction of the first side plate and the second side plate provided with the weight attachment holes.

5. The torque damper apparatus according to claim 1, wherein
the input-side plate has a projecting portion formed in such a manner that part of a periphery of each of the first and second side plates projects in an axial direction of the side plates.

6. The torque damper apparatus according to claim 1, wherein
the input-side plate is provided in a housing space housing hydraulic oil, and has a side plate opposing through-hole as a through-hole formed at a portion of the first side plate and the second side plate facing each weight attachment hole, and
the center plate has a center plate opposing through-hole as a through-hole formed at a portion facing each weight attachment hole and each side plate opposing through-hole.

7. The torque damper apparatus according to claim 1, wherein
the input-side plate is configured such that a length between two of the weight attachment holes adjacent to each other in the circumferential direction of the first side plate and the second side plate provided with the weight attachment holes is shorter than a length of each of the two of the weight attachment holes in the circumferential direction.

8. A torque converter comprising:
a torque converter cover forming a housing space housing hydraulic oil, having, in the housing space, a pump impeller configured to cause a hydraulic oil flow, and rotatably driven by the drive force of the motor together with the pump impeller;
a turbine runner arranged facing the pump impeller and rotatably driven by the hydraulic oil flow to rotatably drive the output shaft; and
the torque damper apparatus according to claim 1.

9. The torque converter according to claim 8, further comprising:
a clutch apparatus configured to transmit rotary drive force of the torque converter cover to the input-side plate of the torque damper apparatus or block the transmission,
wherein the input-side plate is rotatably driven in response to the drive force from the motor through each of the torque converter cover and the clutch apparatus.

10. A torque damper apparatus comprising:
an input-side plate which includes a pair of side plates having a first side plate formed in an annular flat plate shape and an annular flat plate-shaped second side plate arranged facing the first side plate at a position apart from the first side plate and rotatably driven together with the first side plate and which is rotatably driven in response to drive force from a motor;
an annular flat plate-shaped center plate coupled to an output shaft and arranged between the first side plate and the second side plate in a state in which the center plate is rotatable relative to both side plates; and
an elastic transmission body which includes an elastic body and provided between the input-side plate and the center plate to transmit rotary drive force of the input-side plate to the center plate,
wherein the input-side plate has, at a plate surface of at least one of the first side plate or the second side plate, multiple weight attachment holes as through-holes for attaching a balance weight for adjusting balance of the input-side plate upon rotary drive,
each weight attachment hole is formed in a long hole shape extending along a circumferential direction at an outer edge portion of the first side plate and the second side plate, which is provided with the weight attachment holes, adjacent to an outer peripheral end portion thereof, and
the each weight attachment hole is formed with a length of equal to or greater than an angle range of 10° about a center of rotation of the first side plate and the second side plate provided with the weight attachment holes.

11. A torque damper apparatus comprising:
an input-side plate which includes a pair of side plates having a first side plate formed in an annular flat plate shape and an annular flat plate-shaped second side plate arranged facing the first side plate at a position apart from the first side plate and rotatably driven together with the first side plate and which is rotatably driven in response to drive force from a motor;
an annular flat plate-shaped center plate coupled to an output shaft and arranged between the first side plate and the second side plate in a state in which the center plate is rotatable relative to both side plates; and
an elastic transmission body which includes an elastic body and provided between the input-side plate and the center plate to transmit rotary drive force of the input-side plate to the center plate,
wherein the input-side plate has, at a plate surface of at least one of the first side plate or the second side plate, multiple weight attachment holes as through-holes for attaching a balance weight for adjusting balance of the input-side plate upon rotary drive, each weight attachment hole is formed in a long hole shape extending along a circumferential direction at an outer edge portion of the first side plate and the second side plate, which is provided with the weight attachment holes, adjacent to an outer peripheral end portion thereof, the input-side plate is provided in a housing space housing hydraulic oil, and has a side plate opposing through-hole as a through-hole formed at a portion of the first side plate and the second side plate facing each weight attachment hole, and the center plate has a center plate opposing through-hole as a through-hole formed at a portion facing each weight attachment hole and each side plate opposing through-hole.

12. A torque damper apparatus comprising:

an input-side plate which includes a pair of side plates having a first side plate formed in an annular flat plate shape and an annular flat plate-shaped second side plate arranged facing the first side plate at a position apart from the first side plate and rotatably driven together with the first side plate and which is rotatably driven in response to drive force from a motor;

an annular flat plate-shaped center plate coupled to an output shaft and arranged between the first side plate and the second side plate in a state in which the center plate is rotatable relative to both side plates; and an elastic transmission body which includes an elastic body and provided between the input-side plate and the center plate to transmit rotary drive force of the input-side plate to the center plate, wherein the input-side plate has, at a plate surface of at least one of the first side plate or the second side plate, multiple weight attachment holes as through-holes for attaching a balance weight for adjusting balance of the input-side plate upon rotary drive, each weight attachment hole is formed in a long hole shape extending along a circumferential direction at an outer edge portion of the first side plate and the second side plate, which is provided with the weight attachment holes, adjacent to an outer peripheral end portion thereof, and the input-side plate is configured such that a length between two of the weight attachment holes adjacent to each other in the circumferential direction of the first side plate and the second side plate provided with the weight attachment holes is shorter than a length of each of the two of the weight attachment holes in the circumferential direction.

13. A torque damper apparatus comprising:

an input-side plate which includes a pair of side plates having a first side plate formed in an annular flat plate shape and an annular flat plate-shaped second side plate arranged facing the first side plate at a position apart from the first side plate and rotatably driven together with the first side plate and which is rotatably driven in response to drive force from a motor;

an annular flat plate-shaped center plate coupled to an output shaft and arranged between the first side plate and the second side plate in a state in which the center plate is rotatable relative to both side plates; and an elastic transmission body which includes an elastic body and provided between the input-side plate and the center plate to transmit rotary drive force of the input-side plate to the center plate, wherein the input-side plate has, at a plate surface of at least one of the first side plate or the second side plate, multiple weight attachment holes as through-holes for attaching a balance weight for adjusting balance of the input-side plate upon rotary drive, each weight attachment hole is elongated in a circumferential direction at an outer edge portion of the first side plate and the second side plate and forms an axial through-hole in the first and the second side plates, and the balance weight is formed in a clip shape sandwiching the first side plate or the second side plate provided with the weight attachment holes.

\* \* \* \* \*